United States Patent
Kim et al.

(10) Patent No.: US 12,329,335 B2
(45) Date of Patent: Jun. 17, 2025

(54) MOVING ROBOT AND CONTROL METHOD THEREOF

(71) Applicant: LG ELECTRONICS INC., Seoul (KR)

(72) Inventors: Junghwan Kim, Seoul (KR); Wonkeun Yang, Seoul (KR); Minho Lee, Seoul (KR); Jeongwoo Ju, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 362 days.

(21) Appl. No.: 17/802,270

(22) PCT Filed: Feb. 26, 2021

(86) PCT No.: PCT/KR2021/002458
§ 371 (c)(1),
(2) Date: Aug. 25, 2022

(87) PCT Pub. No.: WO2021/172936
PCT Pub. Date: Sep. 2, 2021

(65) Prior Publication Data
US 2023/0091839 A1 Mar. 23, 2023

(30) Foreign Application Priority Data
Feb. 28, 2020 (KR) .................. 10-2020-0025508

(51) Int. Cl.
*A47L 11/40* (2006.01)
*G01B 11/25* (2006.01)
(Continued)

(52) U.S. Cl.
CPC ....... *A47L 11/4011* (2013.01); *A47L 11/4061* (2013.01); *G01B 11/25* (2013.01);
(Continued)

(58) Field of Classification Search
CPC .............. A47L 11/4011; A47L 11/4061; A47L 2201/04; A47L 2201/06; A47L 9/2805;
(Continued)

(56) References Cited

U.S. PATENT DOCUMENTS 11,586,211 B2 * 2/2023 Kim .................. G06T 7/20
11,691,264 B2 * 7/2023 Wang ................ G06T 7/70
345/166

(Continued)

FOREIGN PATENT DOCUMENTS

JP 2005-324297 11/2005
KR 10-0834577 6/2008
(Continued)

OTHER PUBLICATIONS

European Search Report dated Apr. 29, 2024 issued in Application No. 21760537.7.
(Continued)

*Primary Examiner* — Basil T. Jos
*Assistant Examiner* — Benjamin J Brosh
(74) *Attorney, Agent, or Firm* — KED & ASSOCIATES, LLP

(57) ABSTRACT

In a moving robot and a control method according to the present disclosure, an obstacle is detected using structured light irradiated in a predetermined type of light pattern in a traveling direction while traveling, and a specified operation is performed in response to the obstacle. Moreover, a dangerous obstacle is recognized by extracting changes over time using a plurality of images for an obstacle or a low obstacle that is difficult to determine as detected data, and thus, it is possible to improve accuracy according to the determination of the obstacle, improve a corresponding operation according to the obstacle, minimize the uncleaned (Continued)

area while preventing restraint due to the obstacle, and improve the cleaning performance.

13 Claims, 10 Drawing Sheets

(51) Int. Cl.
    *G05D 1/00*     (2006.01)
    *G06T 7/521*     (2017.01)

(52) U.S. Cl.
    CPC ........... *G05D 1/0246* (2013.01); *G06T 7/521* (2017.01); *A47L 2201/04* (2013.01); *A47L 2201/06* (2013.01)

(58) Field of Classification Search
    CPC .... A47L 9/2852; G05D 1/0246; G06V 20/10; B25J 11/0085; B25J 9/1666; B25J 9/1676; B25J 9/1697; G01B 11/25; G06T 7/521
    See application file for complete search history.

(56) References Cited

U.S. PATENT DOCUMENTS

| | | | |
|---|---|---|---|
| 2007/0019181 A1 | 1/2007 | Sinclair et al. | |
| 2007/0267570 A1* | 11/2007 | Park | A47L 9/009 250/221 |
| 2013/0204483 A1* | 8/2013 | Sung | H04N 13/254 701/28 |
| 2013/0338831 A1* | 12/2013 | Noh | B25J 9/0003 700/259 |
| 2015/0120056 A1* | 4/2015 | Noh | G01S 7/4814 901/1 |
| 2015/0185322 A1* | 7/2015 | Haegermarck | G01S 17/06 901/1 |
| 2018/0181141 A1* | 6/2018 | Hsu | G05D 1/0248 |
| 2019/0035100 A1* | 1/2019 | Ebrahimi Afrouzi | G06N 3/045 |
| 2021/0026364 A1* | 1/2021 | Shin | G05D 1/0246 |
| 2021/0132607 A1* | 5/2021 | Maeng | G05D 1/0238 |
| 2021/0354302 A1* | 11/2021 | Bathala | B25J 13/089 |
| 2021/0361132 A1* | 11/2021 | Sung | A47L 9/2852 |

FOREIGN PATENT DOCUMENTS

| | | | |
|---|---|---|---|
| KR | 10-2013-0034573 | 4/2013 | |
| KR | 10-2018-0023302 | 3/2018 | |
| KR | 10-2019-0010301 | 1/2019 | |
| KR | 10-2019-0103512 | 9/2019 | |
| TW | 201825037 | 7/2018 | |
| WO | WO-2016005011 A1 * | 1/2016 | ........... G05D 1/0248 |

OTHER PUBLICATIONS

International Search Report dated Jun. 8, 2021 issued in Application No. PCT/KR2021/002458 .

* cited by examiner

【FIG. 1】
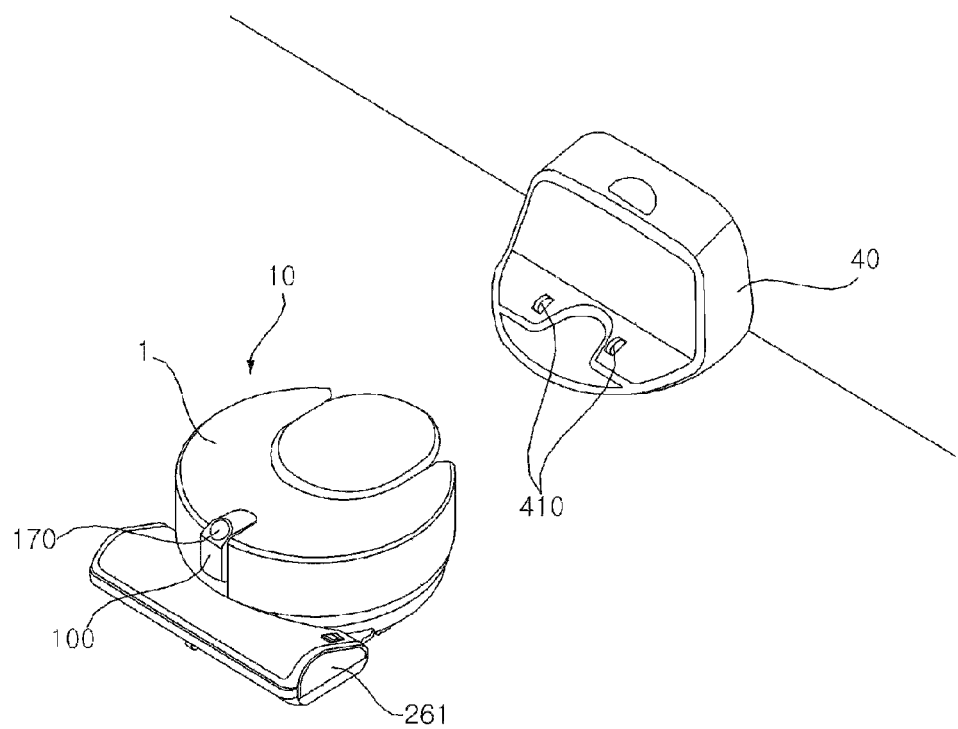

[FIG. 2]
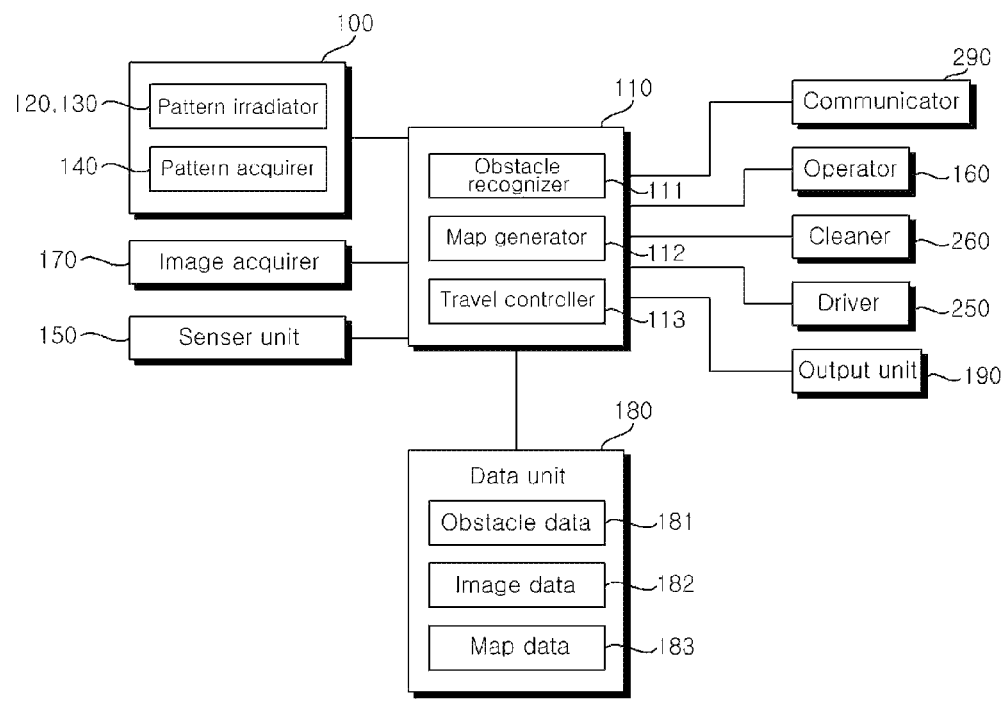
[FIG. 3A]
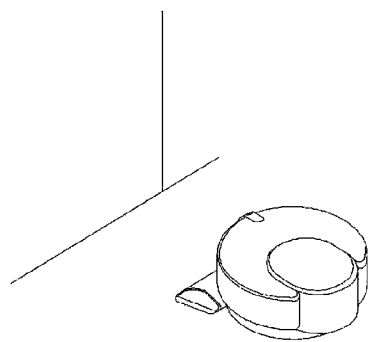
[FIG. 3B]
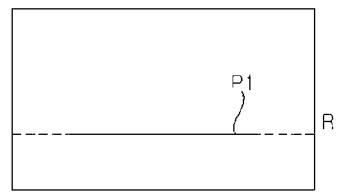

【FIG. 4A】
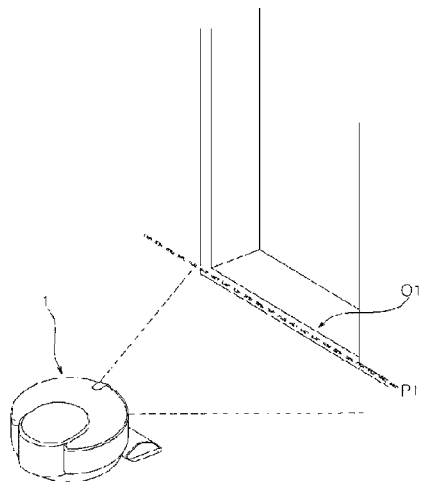
【FIG. 4B】
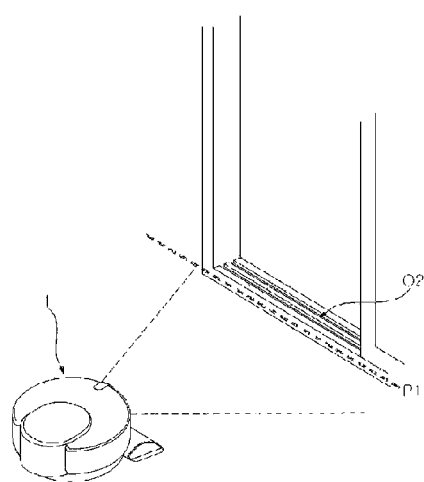

[FIG. 5A]
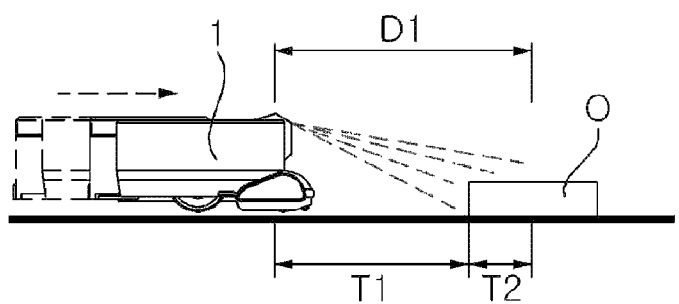
[FIG. 5B]
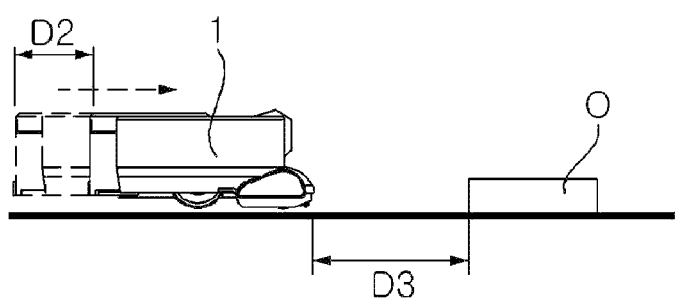

【FIG. 6A】
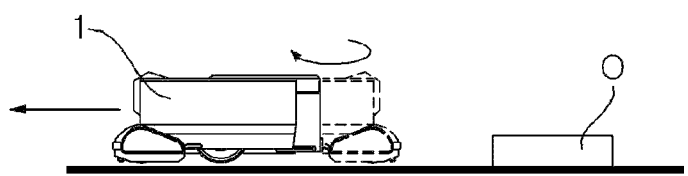
【FIG. 6B】
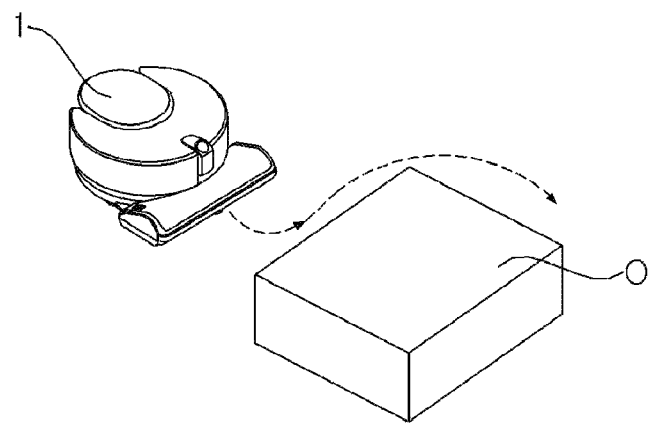
【FIG. 6C】
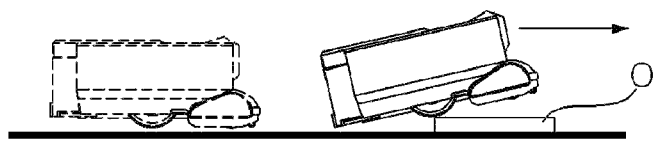

[FIG. 7]
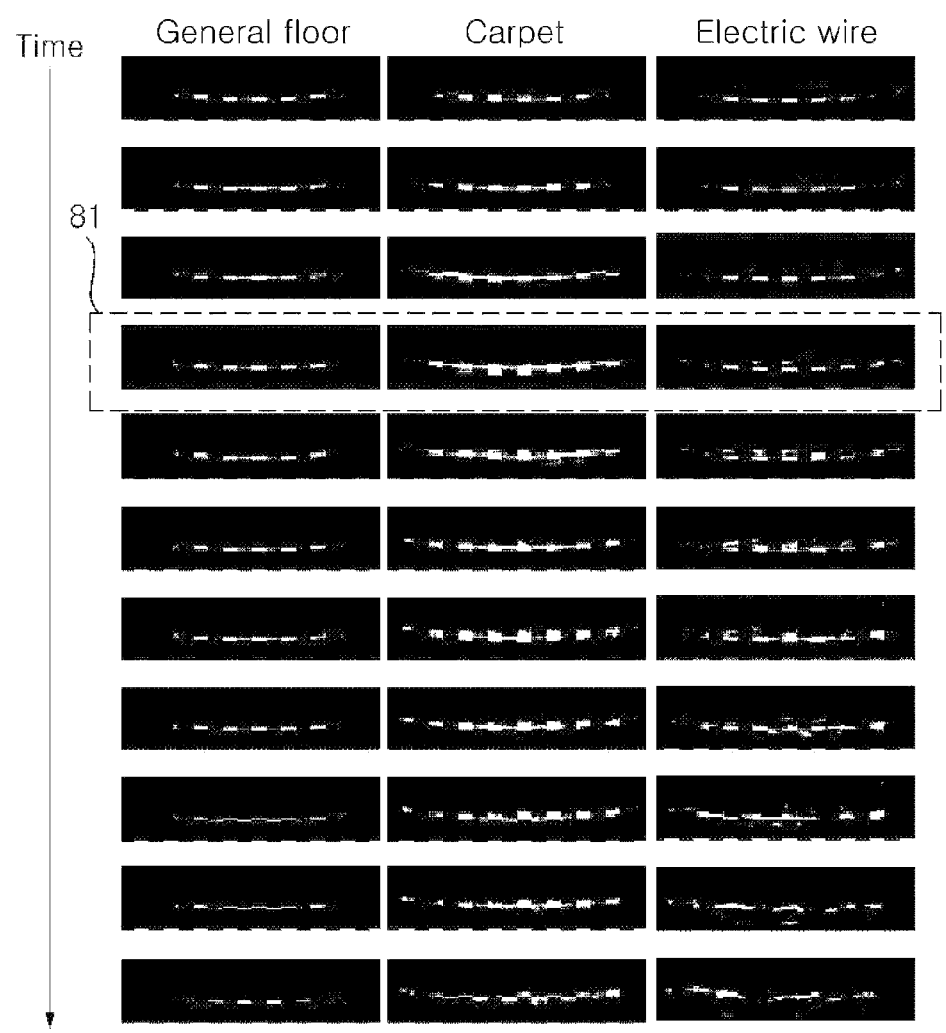

【FIG. 8】
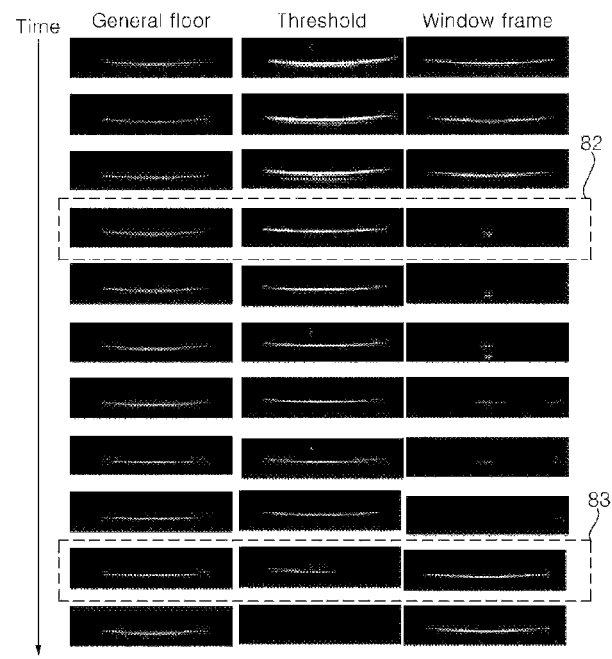
【FIG. 9】
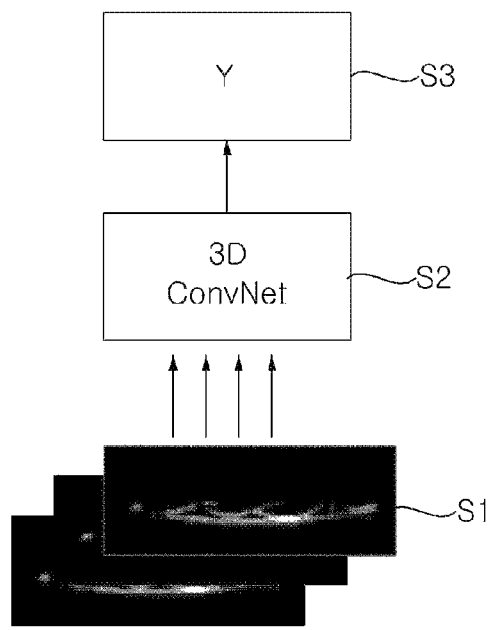

【FIG. 10A】
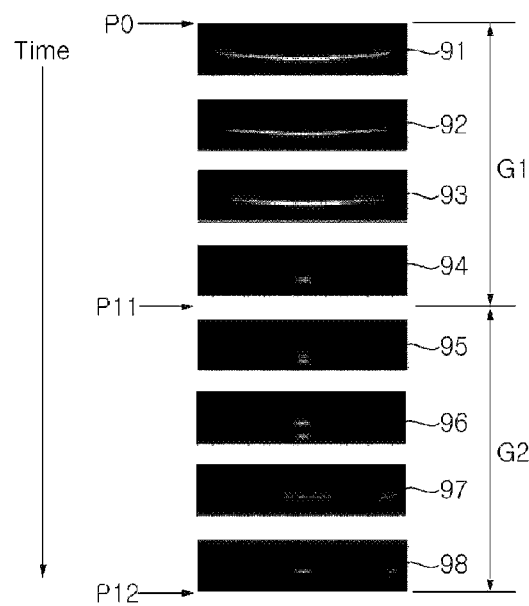
【FIG. 10B】
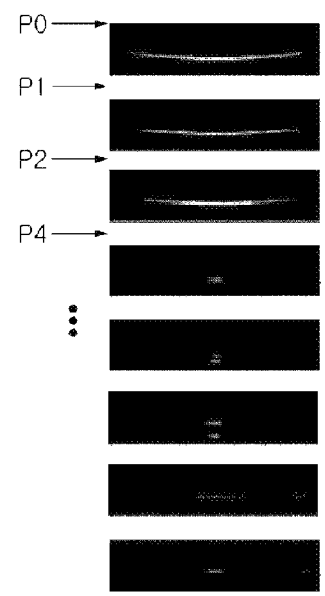
【FIG. 11A】
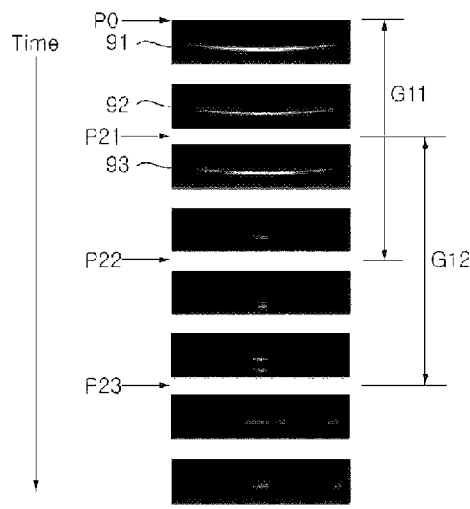
【FIG. 11B】
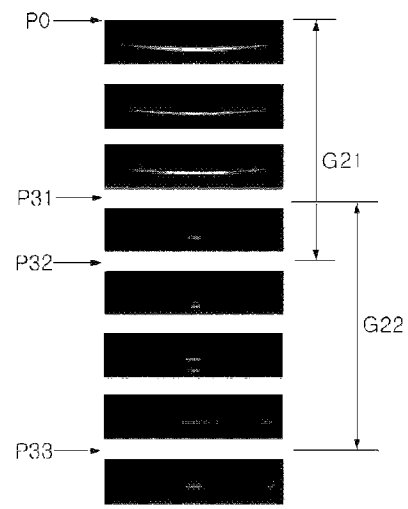

[FIG. 12]
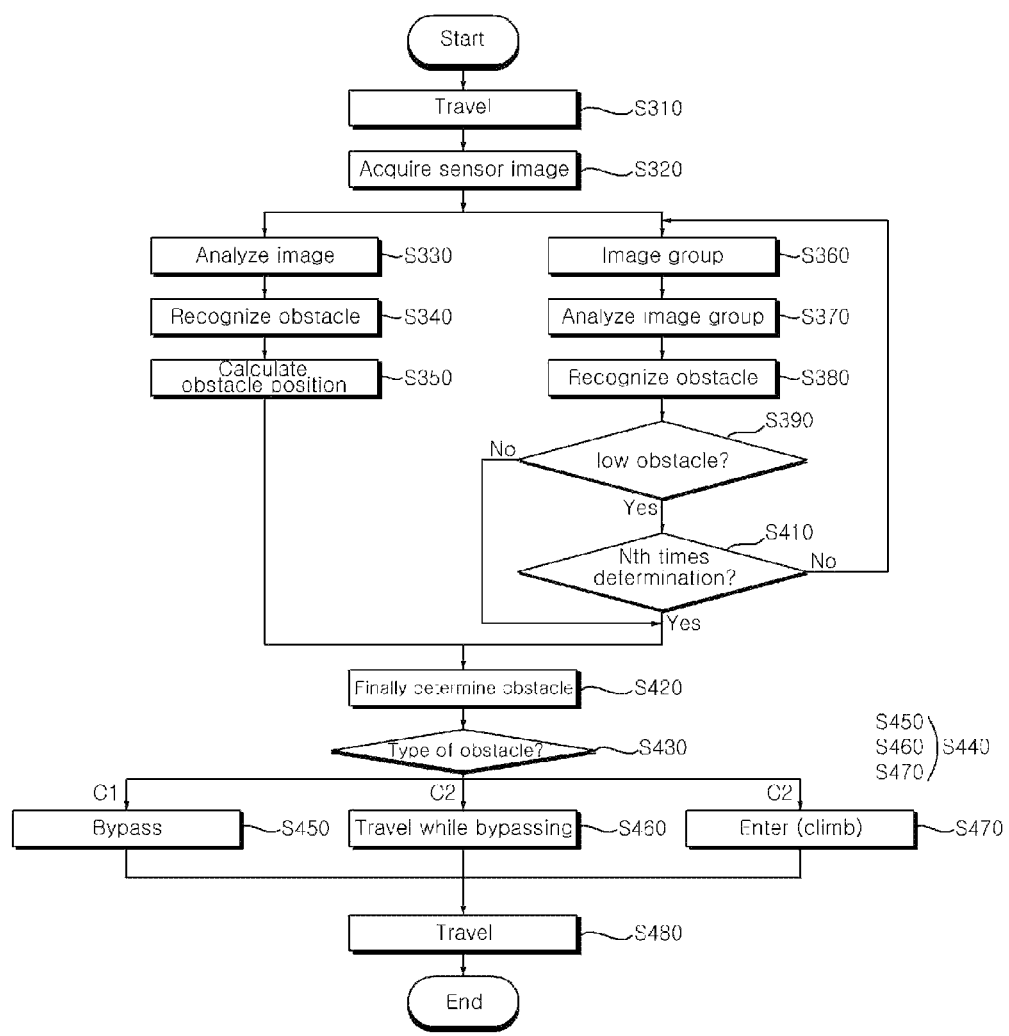

[FIG. 13]
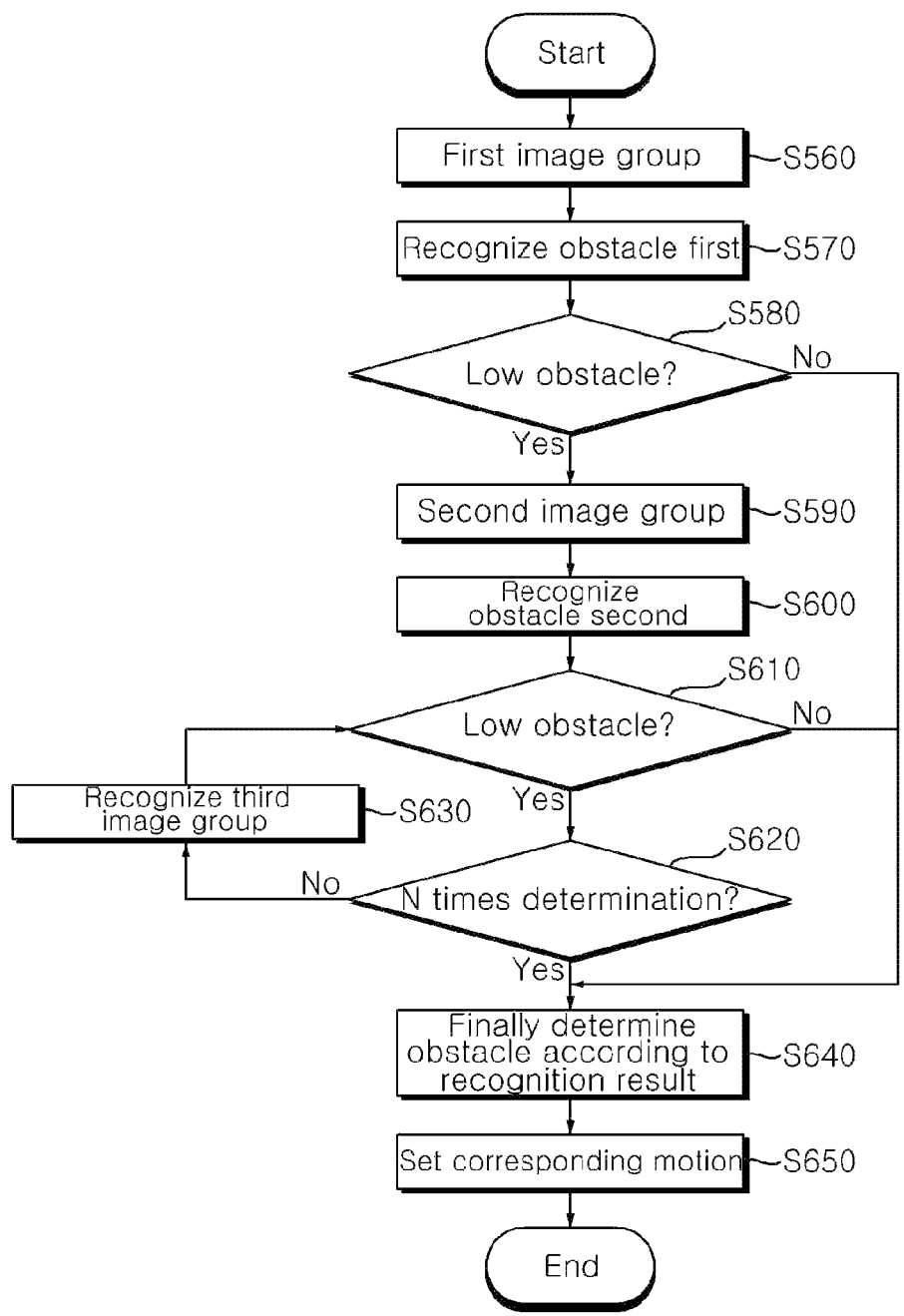

MOVING ROBOT AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2021/002458, filed Feb. 26, 2021, which claims priority to Korean Patent Application No. 10-2020-0025508, filed Feb. 28, 2020, whose entire disclosures are hereby incorporated by reference.

TECHNICAL FIELD

The present disclosure relates to a moving robot and a control method thereof, and to a moving robot that recognizes an obstacle while traveling an area and a control method thereof.

BACKGROUND ART

In general, a moving robot is a device that automatically cleans by suctioning foreign substances such as dust from a floor while traveling a region to be cleaned without manipulation of a user.

The moving robot can create a map for an area while traveling an area to be cleaned. The moving robot can perform cleaning while traveling based on the generated map.

In addition, the moving robot detects an obstacle located in an area while traveling and travels to avoid the obstacle. The moving robot has a plurality of sensors to detect obstacles. The moving robot receives signals from a plurality of sensors, detects an obstacle based on a plurality of sensor signals, and travels to avoid the obstacle.

Korean Patent Application Laid-Open No. 10-2013-0034573 describes a robot cleaner that detects obstacles in all directions using line light. The robot cleaner detects an obstacle based on the shape of the line light by irradiating the obstacle with the line light.

However, in the conventional disclosure, as an obstacle is detected only by physical sensing values such as height and distance of the obstacle, it is determined whether or not the robot cleaner travels or enters only with the height of the obstacle.

Since it is not possible to ascertain the shape and characteristics of the obstacle in the conventional disclosure, the traveling is determined only by the height of the obstacle, and thus the robot cleaner may be in a dangerous situation or be restrained by the obstacle.

If it is determined that the robot cleaner can enter, the robot cleaner travel to pass through the obstacle. However, in this process, there is a problem that the robot cleaner cannot move because the robot cleaner is restricted by the obstacle.

For example, when the robot cleaner detects a threshold, the robot cleaner moves over the threshold. However, in a structure in which grooves and protrusions are mixed such as a window frame, the moving robot may be restrained.

Therefore, there is a need for the cleaner to more accurately recognize the obstacle so as to control traveling.

DISCLOSURE OF INVENTION

Technical Problem

An object to be solved by the present disclosure is to provide a moving robot and a control method thereof that detect an obstacle using structured light irradiated in a predetermined type of light pattern in a traveling direction while traveling and performs a specified operation in response to the obstacle.

An object of the present disclosure is to determine an obstacle by learning a change of structured light over time using an image capturing the structured light, without depending only on a sensor value to determine the obstacle.

An object of the present disclosure is to prevent a dangerous situation in advance by recognizing an obstacle that is difficult to perform determination by a measured sensor value or a low obstacle as a dangerous obstacle, and operating in response thereto.

An object of the present disclosure is to avoid obstacle based on a three-dimensional coordinate value using an image of 3D sensor line structured light.

An object of the present disclosure is to perform cleaning without an uncleaned area while avoiding dangerous obstacles through accurate obstacle identification.

Technical problems of the present disclosure are not limited to the technical problems mentioned above, and other technical problems that are not mentioned will be clearly understood by those skilled in the art from the following description.

Solution to Problem

In a moving robot and a control method thereof according to one embodiment of the present disclosure to achieve the objects, by accumulating and analyzing data on structured light of a 3D sensor, an obstacle is determined through a pattern change of the structured light according to the obstacle.

In the present disclosure, an obstacle is determined by simultaneously performing a first determination on the structured light of the 3D sensor and a second determination based on accumulated structured light data.

In the present disclosure, a position of the obstacle is determined by the first determination through the structured light, and the obstacle is classified by analyzing the change through accumulated data.

In the present disclosure, the obstacle is determined by overlapping and analyzing data of structured light accumulated at fixed time intervals before reaching the obstacle.

In the present invention, whether or not it is possible to climb a low obstacle is determined by learning a structured light image of a 3D patterned light of an object through deep learning.

In the present invention, the moving robot quickly moves to a designated location or performs a designated operation by responding to or avoiding a low or dangerous obstacle through learning.

According to an aspect of the present disclosure, there is provided a moving robot including: a main body configured to travel an area; an obstacle detector configured to capture an acquired image with respect to a light pattern irradiated in a traveling direction and detect an obstacle located in the traveling direction; and a controller configured to recognize the obstacle according to position and shape of the light pattern from the acquired image captured by the obstacle detector and designate a corresponding motion for the obstacle according to an obstacle determination result to control an operation, in which the controller detects the obstacle from the acquired image input over time and determines a position of the obstacle, and the controller accumulates the acquired images, sets an image group including a plurality of acquired images in a predetermined time unit, and determines the obstacle through a change in the light patterns of the plurality of acquired images with respect to the image group.

According to another aspect of the present disclosure, there is provided a control method of a moving robot, including: a step of capturing a light pattern irradiated in a traveling direction using an obstacle detection and inputting an acquired image; a step of detecting an obstacle from the acquired image to determine a position of the obstacle; a step of accumulating and storing the acquired image and setting an image group including a plurality of acquired images every fixed time; a step of comparing the plurality of acquired images included in the image group to extract the change in the light pattern over time and determine the obstacle; and a step of setting a corresponding motion according to the obstacle and performing an operation according to the corresponding motion.

Advantageous Effects of Invention

According to the moving robot and the control method thereof of the present disclosure, it is possible to quickly and accurately determine the obstacle through the change pattern by analyzing the structured light images accumulated at fixed time intervals for the detected obstacle.

According to the present disclosure, it is possible to improve the accuracy of obstacle determination by determining the position of the obstacle by the first determination through structured light, and by analyzing a change through accumulated data to classify the obstacle.

According to the present disclosure, it is possible to improve the accuracy according to the obstacle determination because it is possible to classify low obstacles that are difficult to classify the obstacle only by the first determination of the structured light.

According to the present disclosure, it is possible to improve an avoidance operation according to a simple distance and height.

According to the present disclosure, by analyzing the change pattern of the structured light of the 3D sensor to determine the obstacle, it is possible to set the corresponding motion according to the obstacle in advance.

According to the present disclosure, by classifying a low obstacle having a certain size or less, which are difficult to classify, a corresponding motion can be set to pass or avoid the obstacle according to the obstacle.

According to the present disclosure, the moving robot avoids a dangerous situation and a restraint situation in advance, and thus, it is possible to prevent an occurrence of the dangerous situation and reduce a rate of restraint.

According to the present disclosure, the moving robot can quickly move to a destination or complete a designated operation by performing a corresponding motion through determination of the obstacle.

According to the present disclosure, it is possible to improve cleaning performance by minimizing an uncleaned area and maximizing a travelable area through an accurate determination with respect to the obstacle.

BRIEF DESCRIPTION OF DRAWINGS

FIG. 1 is a perspective view illustrating a moving robot according to one embodiment of the present disclosure.

FIG. 2 is a block diagram illustrating main portions of the moving robot according to one embodiment of the present disclosure.

FIGS. 3A and 3B are views referenced to describe a configuration for detecting an obstacle of the moving robot according to one embodiment of the present disclosure.

FIGS. 4A and 4B are views referenced to describe an example of detecting an obstacle by a moving robot according to one embodiment of the present disclosure.

FIGS. 5A and 5B are diagrams referenced for describing a process of detecting and determining an obstacle by the moving robot according to one embodiment of the present disclosure.

FIGS. 6A to 6C are diagrams referenced for describing a corresponding motion according to an obstacle determination of the moving robot according to one embodiment of the present disclosure.

FIGS. 7 and 8 are diagrams illustrating a structured light image for the obstacle of the moving robot according to one embodiment of the present disclosure.

FIG. 9 is a diagram illustrating a flow of determining the obstacle through the structured light image of the moving robot according to one embodiment of the present disclosure.

FIGS. 10A and 10B are diagrams referenced for describing a method of determining the obstacle based on an acquired image of the moving robot according to one embodiment of the present disclosure.

FIGS. 11A and 11B are diagrams referenced for describing a method of setting an image group of the acquired images of the moving robot according to one embodiment of the present disclosure.

FIG. 12 is a flowchart illustrating an operation method of the moving robot according to one embodiment of the present disclosure with respect to the obstacle.

FIG. 13 is a flowchart illustrating a method of determining the obstacle of the moving robot according to one embodiment of the present disclosure.

MODE FOR THE INVENTION

Advantages and features of the present disclosure, and a method of achieving them will become apparent with reference to embodiments described below in detail together with the accompanying drawings. However, the present disclosure is not limited to the embodiments disclosed below, but may be implemented in a variety of different forms, the embodiments are provided only to ensure that the disclosure of the present disclosure is complete, and to fully inform the scope of the invention to those of ordinary skill in the technical field to which the present disclosure belongs, and the present disclosure is only defined by a scope of claims. The same reference numerals refer to the same components throughout the specification. A control configuration of the present disclosure may include at least one processor.

FIG. 1 is a perspective view illustrating a moving robot according to one embodiment of the present disclosure.

Referring to FIG. 1, a moving robot 1 according to one embodiment of the present disclosure includes a main body 10 that moves along a floor of a cleaning area and suctions foreign substances such as dust on the floor, and detection units 100 and 170 which are provided on a front surface of the body 10 to detect an obstacle.

The main body 10 includes a casing (not illustrated) that forms an exterior and forms a space in which parts constituting the main body 10 are accommodated, a suction unit 261 that is disposed in the casing to suction foreign substances such as dust or garbage, and a left wheel (not illustrated) and a right wheel (not illustrated) rotatably provided in the casing. As the left and right wheels rotate, the main body 10 moves along the floor of the cleaning area, and in this process, the foreign substances are suctioned through a suction port (not illustrated) formed toward a floor surface.

The suction unit 261 may include a suction fan (not illustrated) that generates suction power, and a suction port (not illustrated) through which airflow generated by rotation of the suction fan is suctioned. The suction unit 261 may include a filter (not illustrated) that collects foreign substances from the airflow sucked through the suction port, and a foreign substance collecting container (not illustrated) in which the foreign substances collected by the filter are accumulated.

The suction unit 261 includes a rotating brush (not illustrated) and rotates at the same time while suctioning airflow to assist the collection of the foreign substances. The suction unit is configured to be detachable if necessary. The main body 10 may further include a plurality of brushes (not illustrated) that are located on a front side of a bottom surface of the casing and have a brush including a plurality of radially extending blades.

In addition, a wet mop cleaner may be attached to or detached from the suction unit 261. The wet mop cleaner may be mounted on a rear surface of the suction port. In some cases, the wet mop cleaner may be configured separately from the suction unit and may be replaced and mounted at a position fastened and fixed to the suction unit. The wet mop cleaner rotates while moving and wipes the floor in a traveling direction.

The main body 10 may include a driver (not illustrated) that drives the left and right wheels. The driver may include at least one driving motor.

The main body 10 may further include a plurality of brushes (not illustrated) that are located on the front side of the bottom surface of the casing and have the brush including the plurality of radially extending blades. The plurality of brushes removes dust from the floor of the cleaning area by rotation, and the dust separated from the floor is suctioned through the suction port and collected in the collection container.

A control panel including an operator (not illustrated) that receives various commands for controlling the moving robot 1 from a user may be provided on an upper surface of the casing.

The detection unit includes an obstacle detector 100, a sensor unit (not illustrated) including a plurality of sensors, and an image acquirer 170 for capturing an image. In some cases, the obstacle detector 100 may include the image acquirer 170 and the sensor unit.

The obstacle detector 100 may use a 3D sensor that detects the obstacle through an image captured by irradiating a light pattern. In addition, the obstacle detector 100 may detect the obstacle in the traveling direction using ultrasonic waves, infrared rays, and lasers. The obstacle detector 100 may include at least one camera, and may detect an obstacle from an image captured by the camera.

The obstacle detector 100 may be disposed on the front surface of the main body 10.

The obstacle detector 100 is fixed to the front surface of the casing, and includes a first pattern irradiator (not illustrated), a second pattern irradiator (not illustrated), and a pattern acquirer (not illustrated). In this case, the pattern acquirer may be installed below the pattern irradiator or disposed between the first and second pattern irradiators to capture an irradiated pattern as an image. The first pattern irradiator and the second pattern irradiator irradiate the pattern at a predetermined irradiation angle.

The image acquirer 170 captures an image in the traveling direction of the moving robot 1. In addition, the image acquirer 170 may capture a front in the traveling direction or an upper portion of the traveling direction, for example, a ceiling. The image acquirer 170 may be provided to face the ceiling, and may also be provided to face the front to capture a traveling direction. In addition, the image acquirer 170 may simultaneously capture the front in the traveling direction and the upper side in the traveling direction, that is, the ceiling according to an installation position in the main body 10 and an installation angle with respect to the traveling direction. The image acquirer may have a different angle of view to be captured according to performance of the installed camera or a type of lens.

The image acquirer 170 is described as an example of including at least one camera, and any image acquisition means for capturing an image regardless of the type of camera may be applied.

The image acquirer 170 may include a plurality of cameras, and two cameras facing the front and the ceiling are respectively installed on front surface and upper end of the main body so as to capture images of the front and the ceiling, respectively. In addition, the image acquirer 170 may separately include a camera that captures the floor surface.

The sensor unit 150 may include an infrared sensor, an ultrasonic sensor, and a laser sensor to detect the obstacle. In addition, the sensor unit 150 may include a tilt sensor, for example, a tilting sensor, a gyro sensor, or the like to detect a tilt of the main body 10, and may include an illuminance sensor to detect brightness of an area where the main body 10 is located.

The moving robot 1 may further include a location acquirer (not illustrated) for obtaining current location information. The moving robot (1) determines the current location including GPS and UWB.

The main body 10 includes a rechargeable battery (not illustrated), and a charging terminal (not illustrated) of the battery is connected to a commercial power source (for example, a power outlet in a home) or the main body 10 is docked to a separate charging station connected to the commercial power source. Accordingly, the charging terminal is electrically connected to the commercial power source through contact with a terminal 410 of the charging station, and the battery can be charged. Electrical components constituting the moving robot 1 may receive power from the battery, and thus, the moving robot 1 can self-travel in a state where the battery is charged and the moving robot 1 is electrically separated from the commercial power source.

FIG. 2 is a block diagram illustrating main portions of the moving robot according to one embodiment of the present disclosure.

As illustrated in FIG. 2, the moving robot 1 includes a driver 250, a cleaner 260, a data unit 180, the obstacle detector 100, the image acquirer 170, the sensor unit 150, a communicator 290, the operator 160, an output unit 190, and a controller 110 that controls the overall operation.

The operator 160 includes input means such as at least one button, switch, and touch pad and receives a user command. As described above, the operator may be provided on the upper end of the main body 10.

The output unit 190 has a display such as an LED or LCD, and displays an operation mode, reservation information, a battery state, an operation state, an error state, or the like of the moving robot 1. In addition, the output unit 190 includes a speaker or a buzzer, and outputs a predetermined sound effect, warning sound, or voice guidance corresponding to the operation mode, reservation information, battery state, operation state, or error state.

The data unit 180 stores an acquired image input from the obstacle detector 100, and stores reference data for the obstacle recognizer 111 to determine the obstacle, and stores obstacle information on the detected obstacle.

The data unit 180 stores obstacle data 181 for determining the type of obstacle, image data 182 for storing a captured image, and map data 183 for an area. The map data 183 includes the obstacle information, and various types of maps (maps) for the travelable area searched by the moving robot are stored in the map data 183.

For example, a basic map that includes information on the travelable area searched by a moving robot, a cleaning map where an area is classified from the basic map, a user map created so that the user can check the shape of the area, and a guide map in which the cleaning map and the user map are overlapped and displayed may be stored in the map data 183.

The obstacle data 181 includes the position and size of the detected obstacle. In addition, the obstacle data 181 may include information for recognizing the obstacle and determining the type of the obstacle, and information on an operation set in response to the obstacle. The obstacle data includes motion information on an operation of the moving robot for the recognized obstacle, for example, a traveling speed, traveling direction, whether avoidance, whether to stop, or the like, and information on sound effect, warning sound, and voice guidance output through the speaker 173. The image data 182 may include a captured image, for example, a still image, a moving image, and a panoramic image.

In addition, the data unit 180 stores control data for controlling the operation of the moving robot, data according to a cleaning mode of the moving robot, and a detection signal such as ultrasound/laser by the sensor unit 150.

In addition, the data unit 180 stores data that can be read by a microprocessor, and includes a storage unit such as a hard disk drive (HDD), a solid state disk (SSD), a silicon disk drive (SDD), ROM, RAM, or a flash memory.

The communicator 290 communicates with a terminal 80 by a wireless communication method. In addition, the communicator 290 may be connected to an Internet network through an in-home network to communicate with an external server 90 or the terminal 80 that controls the moving robot.

The communicator 290 transmits the generated map to the terminal 80, receives a cleaning command from the terminal, and transmits data on the operation state and cleaning state of the moving robot to the terminal. In addition, the communicator 290 may transmit the information on the obstacle detected during traveling to the terminal 80 or the server 90.

The communicator 290 transmits and receives data including short-range wireless communication such as ZigBee and Bluetooth, and a communication module such as Wi-Fi and WiBro.

The communicator 290 communicates with the charging station 40 and may receive a charging station return signal or a guide signal for docking the charging station. The moving robot 1 searches for a charging station based on a signal received through the communicator 290 and is docked to the charging station.

Meanwhile, the terminal 80 is a device on which the communication module is mounted to enable network access and a program for controlling the moving robot or an application for controlling the moving robot is installed, and a device such as a computer, a laptop, a smart phone, a PDA, or a tablet PC may be used as the terminal 80. Further, the terminal may also be used as a wearable device such as a smart watch.

The driver 250 includes at least one driving motor to allow the moving robot to travel according to a control command from the travel controller 113. As described above, the driver 250 may include a left wheel drive motor that rotates the left wheel and a right wheel drive motor that rotates the right wheel.

The cleaner 260 operates the brush so that dust or foreign substances around the moving robot can be easily suctioned, and operates a suction device so that the suction device suctions the dust or foreign substances. The cleaner 260 controls the operation of the suction fan provided in the suction unit 261 that suctions foreign substances such as dust or garbage so that the dust is introduced into the foreign substance collection container through the suction port.

In addition, the cleaner 260 may further include a wet mop cleaner (not illustrated) that is installed behind the bottom surface of the main body to mop the floor surface in contact with the floor surface, and a bucket (not illustrated) for supplying water to the wet mop cleaner. The cleaner 260 may include a cleaning tool. For example, a wet mop pad is mounted on the wet mop cleaner to clean the floor surface. The cleaner 260 may further include a separate driving unit for transmitting a rotational force to the wet mop pad of the wet mop cleaner.

The battery (not illustrated) supplies power necessary for the overall operation of the moving robot 1 as well as the driving motor. When the battery is discharged, the moving robot 1 may travel to return to the charging station 40 for charging, and during the return driving, the moving robot 1 may detect the location of the charging station by itself. The charging station 40 may include a signal transmitter (not illustrated) that transmits a predetermined return signal. The return signal may be an ultrasonic signal or an infrared signal, but is not necessarily limited thereto.

The obstacle detector 100 irradiates a pattern of a predetermined shape and acquires the irradiated pattern as an image. The obstacle detector 100 may include at least one pattern irradiator (not illustrated) and a pattern acquirer. In some cases, the image acquirer 170 may operate as the pattern acquirer.

In addition, the obstacle detector 100 may include an ultrasonic sensor, a laser sensor, and an infrared sensor, and may detect a position and a distance dimension of the obstacle located in the traveling direction. In addition, the obstacle detector 100 may detect the obstacle as an image in a traveling direction. The sensor unit and the image acquirer may be included in the obstacle detector.

The sensor unit 150 includes a plurality of sensors to detect the obstacle. The sensor unit 150 detects the obstacle in the front direction, that is, the traveling direction using at least one of laser, ultrasonic, and infrared rays.

In addition, the sensor unit 150 may further include a cliff detection sensor that detects whether a cliff exists on the floor in the travel region. When the transmitted signal is reflected and incident, the sensor unit 150 inputs information on existence of the obstacle or a distance to the obstacle to the controller 110 as an obstacle detection signal.

The sensor unit 150 includes at least one tilt sensor to detect the tilt of the main body. The tilt sensor calculates tilted direction and angle when tilted in front, rear, left and right directions of the main body. A tilt sensor, acceleration sensor, or the like may be used as the tilt sensor, and in the case of the acceleration sensor, any one of a gyro type sensor, an inertial type sensor, and a silicon semiconductor type sensor may be applied.

In addition, the sensor unit 150 may detect an operation state or abnormality through a sensor installed inside the moving robot 1.

The obstacle detector 100 may include a pattern irradiator, a light source, and a light pattern projection element (OPPE) generating a predetermined pattern by transmitting light irradiated from the light source. The light source may be a laser diode (LD), a light emitting diode (LED), or the like. The laser light is superior to other light sources in terms of monochromaticity, straightness, and connection characteristics, and allows precise distance measurement. In particular, since infrared or visible light has a problem in that the accuracy of distance measurement varies greatly depending on factors such as color and material of the object, the laser diode is preferable as the light source. The pattern generator may include a lens and a diffractive optical element (DOE). Various patterns of light may be irradiated according to a configuration of the pattern generator provided in each pattern irradiator.

The pattern acquirer may acquire an image in front of the main body 10 or an image of a ceiling. In particular, pattern light appears in an image (hereinafter, referred to as an acquired image) acquired by the pattern acquirer 140, and hereinafter, the image of the pattern light illustrated in the acquired image is referred to as a light pattern, which is actually an image of the patterned light incident on the actual space on the image sensor. When the pattern irradiator is not provided, the pattern acquirer acquires an image that is located in front of the main body and does not includes the pattern light.

The pattern acquirer may include a camera that converts an image of a subject into an electrical signal and then converts the image into a digital signal and stores the digital signal in a memory device. The camera includes at least one optical lens, an image senor (for example, CMOS image sensor) configured to include a plurality of photodiodes (for example, pixels) formed by light passing through the optical lens, and a digital signal processor (DSP) that configures the image based on the signal output from the photodiodes. The digital signal processor can generate not only a still image but also a moving image constituted by frames composed of still images.

The image sensor is a device that converts an optical image into an electrical signal and is constituted by a chip in which a plurality of photo diodes are integrated, and a pixel is exemplified as the photo diode. Charges are accumulated in each pixel by an image imaged on the chip by light passing through the lens, and the charges accumulated in the pixels are converted into electrical signals (for example, voltage). As the image sensor, a Charge Coupled Device (CCD), a Complementary Metal Oxide Semiconductor (CMOS), or the like are well known.

The obstacle detector 100 detects the obstacle according to the shape of the pattern by analyzing the pattern through the acquired image, and the sensor unit 150 detects the obstacle located at a detected distance of each sensor using the provided sensor.

The image acquirer 170 continuously captures images when the moving robot operates. Moreover, the image acquirer 170 may capture an image at a predetermined period or in a predetermined distance unit. The image acquirer 170 may capture the image when the obstacle is detected by the obstacle detector 100, and may also capture the image even in a moving or cleaning state in which the obstacle is not detected.

The image acquirer 170 may set a capturing period according to a moving speed of the moving robot. In addition, the image acquirer 170 may set the capturing period in consideration of the detected distance by the sensor unit and the moving speed of the moving robot.

The image acquirer 170 may acquire an image in the front in the traveling direction as well as capture an upward ceiling shape.

The image acquirer 170 stores an image captured while the main body travels in the data unit 180 as the image data 182.

The obstacle detector 100 inputs the position of the detected obstacle or information on the movement thereof to the controller 110. The sensor unit 150 may input a detection signal for the obstacle detected by the provided sensor to the controller. The image acquirer 170 inputs the captured image to the controller.

The controller 110 controls the driver 250 so that the moving robot travels within a designated area of the traveling area.

The controller 110 processes data input by the operation of the operator 160 to set the operation mode of the moving robot, outputs the operation state through the output unit 190, and causes the operation state, the error state, or the warning sound, the sound effect, and the voice guidance according to the detection of the obstacle to output through the speaker.

The controller 110 generates a map for the traveling area based on the image acquired from the image acquirer 170 or the obstacle information detected from the obstacle detector 100. The controller 110 generates a map based on information on the obstacle while traveling in the area, but may generate a map by determining the shape of the traveling area from the image of the image acquirer.

The controller 110 recognizes the obstacle with respect to the obstacle detected by the image acquirer 170 or the obstacle detector 100, and controls the driver so that the moving robot performs a specific operation or changes a path in response thereto and moves. In addition, the controller may output a predetermined sound effect or warning sound through the output unit as necessary, and may control the image acquirer to capture an image.

During the traveling, the controller 110 controls the driver 250 and the cleaner 260 so that the cleaner 260 absorbs dust or foreign substances around the moving robot and thus cleans the traveling area. Accordingly, the cleaner 260 operates the brush so that the dust or foreign substances around the moving robot can be easily suctioned, and operates the suction device so that the suction device suctions the dust or foreign substances. The controller controls the cleaner so that the cleaner suctions foreign substances while traveling to perform cleaning.

The controller 110 checks a charging capacity of the battery and determines a timing of return to the charging station. When the charging capacity reaches a certain value, the controller 110 stops the operation being performed and starts searching for a charging station to return to the charging station. The controller 110 may output a notification about the charging capacity of the battery and a notification on the return of the charging station. In addition, when the controller 100 receives a signal transmitted from the charging station through the communicator 290, the moving robot may return to the charging station.

The controller 110 includes the obstacle recognizer 111, a map generator 112, and the travel controller 113.

The map generator 112 generates a map for the area based on obstacle information while traveling the area when the map is initially operated or when the map for the area is not stored. In addition, the map generator 112 updates a previously generated map based on the obstacle information acquired while traveling.

In addition, the map generator 112 analyzes an image acquired while traveling to determine the shape of an area to generate a map. The map generator 112 analyzes the image, extracts feature points, and determines a shape of the area from the extracted features.

The map generator 112 may align a plurality of images or moving images captured through the image acquirer according to a change in position of the moving robot or a passage of time, and match the position to determine the shape of the area.

The map generator 112 generates a basic map based on information obtained from the obstacle recognizer 111 while traveling, and generates a cleaning map by classifying an area from the basic map. The basic map is a map in which a shape of a cleaning area acquired through traveling is displayed as an outline, and the cleaning map is a map in which an area is classified by the basic map. The basic map and the cleaning map include the travelable area of the moving robot and the obstacle information.

After generating the basic map, the map generator 112 classifies the cleaning area into a plurality of areas, includes a connection path connecting the plurality of areas, and generates a map including information on the obstacle in each area. To classify the area on the map, the map generator 112 separates small areas and sets the representative area, and sets the separated small areas to a separate detailed area and merges them into the representative area to generate a map with classified areas.

The map generator 112 processes the shape of the area for each classified area. The map generator 112 may set properties for the classified areas.

In addition, the map generator 112 generates a map including the shape of the area on the basic map or the cleaning map.

The map generator 112 extracts a shape of an area by analyzing an image in which the ceiling is captured from among the acquired images captured by the image acquirer.

The map generator 112 detects features such as points, lines, and surfaces for predetermined pixels constituting an image, and detects the obstacle based on the detected features.

The map generator 112 extracts the outline of the ceiling and determines the shape of the area based on the shape of the ceiling. The map generator 112 may determine the shape of the area by extracting an edge from the image of the ceiling.

The map generator 112 arranges the images captured while the moving robot moves according to a shooting time or a captured position, and determines the shape of the area by connecting features extracted from each image. When the acquired image is a moving image, the map generator 112 arranges a plurality of frames of the moving image according to the order of time, the map generator 112 may extract features by selecting only an image (or frame) related to the ceiling from among a plurality of images. The map generator 112 may extract features after filtering unnecessary images or frames.

The map generator 112 may extract the shape of the area in consideration of a time when the image is captured and a position of the moving robot at the time of capturing, for example, a coordinate value, and a height of a ceiling.

The map generator 112 may determine the shape of the area by comparing the features extracted from each image with each other, determining a connection relationship between the features, and interconnecting the extracted features.

The map generator 112 may extract a fluorescent lamp or a marker positioned on the ceiling from the image and set the fluorescent lamp or marker as a reference.

Moreover, the map generator 112 may classify an area from features extracted from the image. The map generator 112 may determine a location of a door based on the connection relationship between the features, and accordingly, may generate a map constituted by a plurality of areas by classifying boundary lines between areas.

The map generator 112 connects and classifies the extracted features to form a reference line, and then finally confirms the shape of the region based on the reference line.

The obstacle recognizer 111 determines the obstacle through data input from the image acquirer 170 or the obstacle detector 100, the map generator 112 generates a map for the traveling area, and the detected information on the obstacle is included in the map.

The obstacle recognizer 111 determines the obstacle by analyzing data input from the obstacle detector 100. The obstacle recognizer 111 calculates a direction of the obstacle or a distance to the obstacle according to the detection signal of the obstacle detector, for example, a signal such as ultrasound or laser. When an ultrasonic or infrared signal is used, the obstacle recognizer 111 determines the obstacle based on a difference in a type of ultrasonic wave received and a time at which the ultrasonic wave is received according to the distance to the obstacle or the position of the obstacle.

The obstacle recognizer 111 extracts the pattern by analyzing the acquired image including the pattern, and determines the obstacle by analyzing the shape of the pattern.

The obstacle recognizer 111 may determine the obstacle by simultaneously determining the obstacle for each acquired image and determining the obstacle for an image group in which a plurality of acquired images are accumulated.

The obstacle recognizer 111 determines the obstacle by first analyzing the acquired image at predetermined time intervals. The obstacle recognizer 111 determines the obstacle by analyzing the acquired image at predetermined time intervals. The obstacle recognizer 111 may determine the position (coordinate) of the obstacle and the distance to the obstacle from the acquired image.

In addition, the obstacle recognizer 111 accumulates acquired images at fixed time intervals to set the image group, analyzes the image group for the accumulated acquired images, and determines a change in a pattern included in the image.

The obstacle recognizer 111 may determine the obstacle through a pattern change for each acquired image in the image group. The obstacle recognizer 111 may check whether there is an obstacle with respect to a low obstacle of a certain size or less, and determine the type of the obstacle. For example, the obstacle recognizer 111 may classify a general floor, an electric wire, a window frame, a door frame, or the like through the pattern change of the image group.

In addition, the obstacle recognizer 111 may detect a human body. The obstacle recognizer 111 detects a human body by analyzing data input through the obstacle detector 100 or the image acquirer 170, and determines whether the human body is a specific user.

The obstacle recognizer 111 may store pre-registered user data, for example, an image of the user, and features according to the user's shape as data, and determine whether the user is a registered user when detecting a human body.

The obstacle recognizer 111 analyzes the image data and extracts the features of the obstacle, determines the obstacle based on the shape (aspect), size, and color of the obstacle, and determines the position of the obstacle.

The obstacle recognizer 111 may determine the type of the obstacle by extracting features of the obstacle based on the previously stored obstacle data, excluding the background of the image from the image data. The obstacle data 181 is updated by new obstacle data received from the server. The moving robot 1 may store obstacle data on the detected obstacle and may receive data on the type of obstacle from the server for other data. In addition, the obstacle recognizer 111 stores information on the recognized obstacle in the obstacle data, and transmits recognizable image data to a server (not illustrated) through the communicator 290 to determine the type of the obstacle. The communicator 290 transmits at least one image data to the server.

The travel controller 113 controls the driver 250 so that the moving robot travels by changing a moving direction or a traveling path in response to the obstacle information to pass the obstacle or avoid the obstacle.

The travel controller 113 controls the driver 250 to independently control the operations of the left wheel drive motor and the right wheel drive motor so that the main body 10 travels straight or rotates. The travel controller 113 controls the driver 250 and the cleaner 260 according to the cleaning command so that the main body 10 suctions the foreign substances while traveling the cleaning area to perform cleaning.

The travel controller 113 controls the driver 250 so that the main body moves to a set area based on the map generated by the map generator 112 or moves within the set area. In addition, the travel controller 113 controls the driver to perform a predetermined operation in response to the obstacle or change a traveling path according to the detection signal from the obstacle detector 100 to travel.

The travel controller 113 controls the driver to perform at least one of avoidance setting, approach setting, and approach distance setting, stop, deceleration, acceleration, reverse traveling, U-turn, and change in traveling direction in response to the detected obstacle.

In addition, the travel controller 113 may output an error and, if necessary, may output a predetermined warning sound or voice guidance.

FIG. 3 is a view referenced to describe a configuration for detecting the obstacle of the moving robot according to one embodiment of the present disclosure.

The moving robot 1 may travel not only the general floor but also various floors such as carpet while moving to a destination or cleaning an area.

When the moving robot 1 travels on the general floor, that is, a flat floor, as illustrated in (a) of FIG. 3, an acquired image is input by the obstacle detector 100 as illustrated in (b) of FIG. 3.

The acquired image is obtained by projecting the pattern irradiated from the pattern irradiators 120 and 130 of the obstacle detector 100 onto the floor surface or the obstacle, and capturing the pattern obtained by the pattern acquirer 140 as an image.

According to the positions of a reference line R and a pattern P1, the state of the floor surface and the size or shape of the obstacle may be determined. When the pattern P1 in the acquired image is a straight line (horizontal line) positioned on the reference line R, it may be determined as the general floor.

The pattern irradiator irradiates a first pattern and a second pattern, respectively, and the first pattern is projected on the floor surface by being irradiated forward and downward as illustrated, and the second pattern is projected onto an upward obstacle by being irradiated forward and upward. When traveling the general floor without obstacles, since no object to which the second pattern is projected exists, an acquired image on which the first pattern is projected may be obtained.

FIG. 4 is a view referenced to describe an example of detecting the obstacle by the moving robot according to one embodiment of the present disclosure.

As illustrated in FIG. 4, the moving robot 1 may detect an obstacle less than a certain size (height) while traveling.

The moving robot 1 may detect a low obstacle such as a carpet, a threshold, a window frame, and an electric wire higher than the floor surface.

In the case of the low obstacle, the threshold and the carpet are objects that should be passed, but in the case of the window frame or electric wire, the moving robot may be isolated, and thus the window frame or electric wire are obstacles to be avoided.

However, when the moving robot 1 instantly determines the low obstacle as the acquired image for the light pattern, it may be determined as the low obstacle, but there is a limitation in determining the type of the obstacle in detail. That is, the moving robot 1 determines the obstacle as the low obstacle, but does not classify the carpet, threshold, window frame, electric wire, or the like and determines these as the same.

As illustrated in (a) and (b) of FIG. 4, heights of a threshold O1 and a window frame O2 are approximately the same as each other, and the light pattern P1 of the acquired image appears similarly at the first detection point. Accordingly, it is difficult to perform the classification.

The moving robot 1 climbs and passes through the threshold, but the window frame O2 has the potential to be isolated and should be avoided. Accordingly, the moving robot 1 accumulates and analyzes a plurality of acquired images. Therefore, even if the light pattern appears similar at a first time, the moving robot may analyze an acquired image of a second time, an acquired image of a third time, and an acquired image of a fourth time, and classify and recognize the obstacle through the change of the light pattern.

In addition, the moving robot 1 may learn by extracting the change in the light pattern over time as a feature, and recognize the obstacle based on the learned data.

For example, the position of the threshold O1 or the window frame O2 is determined, and the obstacle is determined by analyzing a plurality of acquired images acquired while traveling forward for a fixed time, rather than avoiding when the obstacle is detected at the first time.

For example, in the case of the threshold O1, the acquired image of the same light pattern appears at the second and third times. However, in the case of the window frame, the surface is uneven and irregularities are formed. Therefore, a portion of the surface protrudes, a portion of the surface has a groove, the light pattern may appear differently at each time. That is, when the light pattern is irradiated to the groove, the light pattern does not appear, and when the light pattern is irradiated to the protrusion, the light pattern is displayed on the acquired image, and thus the protrusion and the groove can be classified.

FIG. 5 is a diagram referenced for describing a process of detecting and determining the obstacle by the moving robot according to one embodiment of the present disclosure.

As illustrated in (a) of FIG. 5, the moving robot 1 first determines the obstacle through the acquired image when the obstacle O is detected according to the obstacle detection distance of the obstacle detector 100, and thus can determine the distance to the obstacle.

The moving robot 1 detects and determines the obstacle within a detected distance D1 obtained by summing a linear distance T1 to the obstacle and a distance T2 for recognizing the obstacle.

The moving robot 1 acquires a plurality of acquired images through the obstacle detector 100 until the moving robot 1 approaches the obstacle.

As illustrated in (b) of FIG. 5, the moving robot 1 is in a state that is separated from the obstacle O by a predetermined distance. Accordingly, the moving robot determines the obstacle by analyzing a plurality of acquired images obtained while moving forward and traveling a certain distance D2.

The controller may determine the number of acquired images included in the image group for at least one of a time at which the obstacle detector acquires the acquired image, a traveling speed, an obstacle detection distance of the obstacle detector, and a speed at which an obstacle is recognized from the image. In addition, the controller may set the number of times of determining obstacles according to the image group.

For example, assuming that the time required to acquire one acquired image is 50 ms and the moving robot is 30 cm/s, it takes 50 ms to acquire one acquired image, and thus, about 200 ms is required to acquire four acquired images. In addition, since the moving robot moves 6 cm in the meantime as it takes 200 ms for the four acquired images, a section in which spatial information for recognizing the obstacle from the acquired image is accumulated, that is, a recognition section becomes 6 cm. Accordingly, assuming that the obstacle detection distance of the obstacle detector 100 is 19 cm, the recognition section becomes about 6 cm, and a sensing distance becomes 25 cm.

The moving robot extracts, as a feature, a change in the light patterns included in the four acquired images including 4 acquired images in one image group, and recognizes the obstacle based on the feature.

In addition, the moving robot 1 may approach by the designated distance D3 and then perform a corresponding motion according to the obstacle determination result. It is possible to avoid and travel by a designated distance D3 from an obstacle, for example, a 13 cm distance.

The designated distance can be changed depending on the traveling speed of the moving robot and an image acquisition time.

Meanwhile, the moving robot 1 may move forward until the moving robot reaches the obstacle O. When determining the obstacle O after reaching the obstacle, the moving robot may perform a corresponding motion after moving a certain distance rearward.

The moving robot can move forward until the moving robot collides with an obstacle. If the moving robot touches the obstacle or approaches 1 cm, the moving robot may move rearward to avoid the obstacle and travel.

Therefore, the moving robot may not only determine the obstacle with one acquired image, but also determine the obstacle based on a plurality of acquired images until the moving robot approaches the obstacle.

The moving robot can determine the obstacle by analyzing at least 12 acquired images until the moving robot approaches the obstacle.

Assuming that it takes 100 ms for the moving robot to process four acquired images, it is possible to determine the obstacle by analyzing more acquired images.

In addition, the moving robot 1 may determine the obstacles by setting an image group by overlapping acquired images. The number of acquired images included in one image group may be changed, and the number of overlapped acquired images may also be changed.

The moving robot 1 first determines the obstacle when the moving robot 1 detects the obstacle at the first time, and does not immediately avoid the obstacle. That is, the moving robot determines the obstacle second by analyzing a plurality of acquired images acquired while traveling forward for a fixed time.

Accordingly, the moving robot 1 detects the obstacle from the acquired image and determines the position of the acquired image, and at the same time analyzes the image group of the acquired image accumulated at regular time intervals to classify the obstacle through the change of the light pattern included in the acquired image.

The moving robot 1 finally determines the obstacle by combining the first determination of the obstacle and the second determination through the image group.

FIG. 6 is a diagram referenced for describing a corresponding motion according to an obstacle determination of the moving robot according to one embodiment of the present disclosure.

As illustrated in FIG. 6, the moving robot 1 may perform a predetermined corresponding motion on the detected obstacle.

When the moving robot 1 detects the obstacle, the moving robot 1 may immediately perform the corresponding motion according to the obstacle. The moving robot 1 may move forward until the moving robot reaches the obstacle O, and when the moving robot determines the obstacle after reaching the obstacle, the moving robot may perform the corresponding motion after moving rearward by a certain distance. In addition, the moving robot 1 may approach the obstacle by a designated distance and then perform the corresponding motion according to the obstacle determination result.

When the moving robot 1 detects the obstacle, that is, when the type of the obstacle is determined as a dangerous obstacle at the first time, the moving robot 1 may immediately perform the corresponding motion such as avoidance, bypass, or warning change.

In addition, the moving robot 1 may detect the obstacle, approach the obstacle by a certain distance, and then perform the corresponding motion after determining the obstacle.

For example, the moving robot 1 analyzes the acquired image at the first time when the obstacle is detected, and if it is determined that the obstacle is an obstacle set not to approach more than a certain size, the moving robot does not approach the obstacle and avoids the obstacle as illustrated in (a) of FIG. 6 without further determination for the obstacle. After the moving robot determines the obstacle once, the moving robot may immediately perform the corresponding motion at the designated distance D3.

In addition, when the moving robot can approach the obstacle, the moving robot may approach the obstacle by a certain distance to determine the obstacle, and the moving robot may set a detour path adjacent to the obstacle as illustrated in (b) of FIG. 6 and travel.

The moving robot may first determine whether the obstacle is a low obstacle, and if the obstacle is not the low obstacle, the moving robot may perform a designated corresponding motion according to the type of the obstacle, and if the obstacle is the low obstacle, the moving robot may perform an additional determination and perform the corresponding motion.

When the obstacle is the low obstacle, the moving robot 1 first determines the obstacle at the first time when the obstacle is detected, and second determines the obstacle by analyzing the image group of the acquired images accumulated while approaching the obstacle by a certain distance.

As illustrated in (c) of FIG. 6, when the lower obstacle is a threshold or a carpet, the moving robot 1 may perform the corresponding motion such as climbing and passing.

Meanwhile, when the low obstacle is an electric wire or a window frame, the moving robot 1 may travel by bypassing as illustrated in (b) of FIG. 6 according to the surrounding obstacle or by changing the traveling path to avoid the obstacle.

The moving robot 1 may perform operations such as avoidance, bypass (route change), passing, and climbing with respect to the detected obstacle.

FIGS. 7 and 8 are diagrams illustrating a structured light image of the obstacle of the moving robot according to one embodiment of the present disclosure.

As illustrated in FIGS. 7 and 8, the moving robot 1 acquires the acquired images for the light pattern at predetermined time intervals through the obstacle detector 100.

As illustrated in FIG. 7, as a time elapses, the moving robot receives the acquired image in which a light pattern is captured while traveling.

The moving robot 1 may determine the obstacle based on the change in the light pattern from a periodically input acquired image. In particular, the moving robot 1 classifies the low obstacle from the changes in the light patterns through image groups accumulated during the fixed time when similar light patterns appear for the low obstacle having a certain height or less.

When the acquired images of the general floor, carpet, and wire are compared with each other over time, differences in some light patterns can be confirmed.

Even when the general floor, carpet, and wires exhibit similar light patterns at the first time, by comparing the acquired images at a second time 81 after the corresponding time, the difference in the light pattern can be confirmed.

In the case of the general floor, the light pattern having a certain shape continuously appears in the acquired image, but in the case of the carpet, it can be seen that the light pattern has a shape thicker and more dispersed than that of the general floor. In addition, in the case of the electric wire, the light pattern is more dispersed than the carpet and partially appears and disappears over time, and the light pattern is not continuous but appears in a broken form. Therefore, if the acquired images are arranged and compared according to time, it can be seen that even if the obstacle is a low obstacle, the general floor, carpet, and electric wire are classified.

In addition, as illustrated in FIG. 8, the moving robot can classify the obstacle through the change in light patterns for a threshold and a window frame based on a general floor.

As described above, in the general floor, the light pattern appears uniformly in the acquired image regardless of time in a certain form. However, in the case of the threshold, the thickness of the light pattern is different from that of the general floor, and then the width becomes narrower, and then the light pattern disappears.

This is a phenomenon that occurs as the pattern irradiator irradiates light at a predetermined angle.

Meanwhile, in the case of the window frame, initially it is similar to the general floor or the threshold, but after the light pattern appears for the fixed time, the light pattern disappears and reappears.

At a third time 82, while the light pattern having a thicker thickness than the general floor appears more clearly in the case of the threshold, the light pattern disappears or some patterns are exposed in the case of the window frame.

Thereafter, it can be seen that at a fourth time 83, the thickness gradually decreases and then the light pattern partially disappears in the case of the threshold, and in the case of the window frame, the disappeared light pattern appears again.

The moving robot 1 compares and analyzes a plurality of acquired images over time, and thus classifies the low obstacles according to types. The moving robot 1 can classify obstacles by learning the change in the light pattern.

Accordingly, the moving robot may perform the corresponding motion in response to the classified obstacle. The moving robot 1 can classify the obstacle using the heights, thicknesses, and light patterns that appear for each obstacle being different.

FIG. 9 is a diagram illustrating a flow of determining the obstacle through the structured light image of the moving robot according to one embodiment of the present disclosure.

As illustrated in FIG. 9, the controller 110 of the moving robot 1 determines the obstacle from an acquired image input from the obstacle detector 100.

In the obstacle detection 100, when the light pattern irradiated through the pattern irradiator is projected onto the floor or object, the obstacle is captured as an image by the pattern acquiring unit 140.

The obstacle detector 100 applies the acquired image including the light pattern to the controller 110.

The obstacle recognizer 111 of the controller 110 first determines the obstacle with respect to the acquired image.

The obstacle recognizer 111 determines the obstacle based on a regression analysis convolutional neural network (CNN) and an LSTM for each input acquired image. In addition, the CNN results are analyzed based on Long Short Term Memory (LSTM), and the obstacle is determined by processing short-term data and long-term data. The obstacle recognizer 111 may determine the obstacle by synthesizing the analysis results for each acquired image.

In addition, the obstacle recognizer 111 accumulates the acquired images for a predetermined time (S1), analyzes the image group set as a plurality of acquired images (S2), and classifies the obstacles (S3).

The obstacle recognizer 111 collects 3D sensor data of the obstacle detector 100, that is, a plurality of acquired images, based on deep learning, and processes the acquired images in units of image groups at once. In this case, the change pattern may be calculated and predicted by determining the change over time.

The obstacle recognizer may process the plurality of acquired images at once based on a 3D ConvNet (CNN, convolutional neural network), and instantaneously determine the image according to time.

The obstacle recognizer extracts the features of the image through the CNN and determines the obstacle over time.

The determination for the obstacle can be also performed by transmitting data to an external server in some cases.

FIG. 10 is a diagram referenced for describing a method of determining the obstacle based on an acquired image of a moving robot according to one embodiment of the present disclosure.

The obstacle recognizer 111 determines the obstacle based on the acquired image input from the obstacle detector 100 over time from a moment when the obstacle is detected in a process of approaching the window frame, which is an obstacle, until the moving robot approaches the obstacle.

Hereinafter, the determination of the obstacle based on a plurality of acquired images will be described with an example that the obstacle is the window frame.

As illustrated in (a) of FIG. 10, the obstacle recognizer 111 may set image groups G1 and G2 based on a set time interval or the number of acquired images for the acquired images input at predetermined time intervals.

The obstacle recognizer 111 may set first to fourth acquired images 91 to 94 from a first time P0 as the first image group G1, and set the fifth to eighth images 95 to 98 from an eleventh time P11 as the second image group G2. The number of acquired images included in the image group and a period for setting the image group may be changed according to the setting.

The obstacle recognizer 111 may determine the obstacle from the first image group G1 and also determine the obstacle from the second image group G2.

In addition, as illustrated in (b) of FIG. 10, the obstacle is determined by analyzing the acquired images input at the first time P0 to the fourth time P4. The obstacle recognizer 111 recognizes the obstacle by processing the first to fourth acquired images 91 to 94 at each input time.

The obstacle recognizer 111 may perform the obstacle determination through each acquired image and the obstacle determination for the image group using a plurality of acquired images at the same time, and may finally classify and determine the obstacle by combining the obstacle determinations.

When the first acquired image 91 is input at the first time P0, the obstacle recognizer 111 may determine a position of the first acquired image 91 and a distance between the position and the obstacle.

The obstacle recognizer 111 determines the obstacle by sequentially recognizing individual acquired images as illustrated in (b) of FIG. 10. In addition, since the obstacle recognizer 111 includes the light pattern similar to that of a general floor, the obstacle recognizer 111 may be first determined as the low obstacle. The obstacle recognizer 111 may determine that the obstacle is different from the general floor through learning.

In addition, the obstacle recognizer 111 may determine the obstacle through learning by recognizing the change in the light pattern from a plurality of acquired images through the image groups G1 and G2 as illustrated in (a) of FIG. 10. The obstacle recognizer 111 may determine that the obstacle is the window frame classified as a dangerous obstacle among obstacles having a low obstacle through a change in a plurality of acquired images through the learning data.

FIG. 11 is a diagram referenced for describing a method of setting an image group of the acquired images of the moving robot according to one embodiment of the present disclosure.

In setting the image group for the acquired image, the obstacle recognizer 111 may set the image group by overlapping the acquired image. By overlapping and analyzing the images, it is possible to easily analyze the change in the light pattern, that is, the structured light in the acquired image within the image group.

As illustrated in (a) of FIG. 11, in setting the image group for the acquired image, the obstacle recognizer 111 may set the first to fourth acquired images 91 to 94 from the first time P0 as an eleventh image group G11, and sets the third to sixth acquired images 93 to 96 as a twelfth image group G12. In addition, the obstacle recognizer 111 may set the fifth acquired image 95 to the eighth acquired image as a twelfth image group.

In the eleventh image group and the twelfth image group, the third and fourth acquired images are included to be overlapped. In addition, in the twelfth image group and a thirteenth image group, the fifth and sixth acquired images are overlapped.

In addition, as illustrated in (b) of FIG. 11, the first to fourth acquired images 91 to 94 may be set as a 21st image group G21, and the fourth to seventh acquired images 94 to 97 may be set as a 22nd image group G22.

In the 21st image group and the 22nd image group, the fourth acquired image is included to be overlapped.

The obstacle recognizer can improve the accuracy by including the acquired image to be overlapped.

FIG. 12 is a flowchart illustrating an operation method of the moving robot according to one embodiment of the present disclosure with respect to the obstacle.

As illustrated in FIG. 12, the moving robot 1 acquires (S320) the acquired image obtained by capturing the light pattern in which the pattern light (structured light) irradiated from the obstacle detector 100 is projected onto an object while traveling (S310).

The obstacle recognizer 111 analyzes the image for the individual acquired image (S330), extracts the light pattern of the acquired image, and recognizes the obstacle based on previously stored data (S340). The obstacle recognizer 111 calculates the position of the obstacle based on the position of the light pattern (S350). The obstacle recognizer 111 may calculate the distance to the obstacle, the position (coordinate) of the obstacle, and the size (height) of the obstacle.

In addition, the obstacle recognizer 111 accumulates a predetermined number of acquired images, and sets the plurality of accumulated acquired images as one image group (S360). The obstacle recognizer 111 analyzes the image group to recognize the change over time in the plurality of acquired images, and recognizes the obstacle according to the change in the light pattern based on previously stored data (S380).

The obstacle recognizer 111 determines whether the obstacle is a low obstacle (S390), counts the number of determinations when the obstacle is the low obstacle, and determines whether the number of determinations reaches n (S410).

If the number of determinations has not reached n times, the obstacle is recognized by analyzing a new image group for the acquired image (S360 to S380). If the obstacle is the low obstacle, the obstacle for the image group is determined by repeating n times. The obstacle may be determined for the first image group in the first determination and the second image group in the second determination, and the acquired images included in each image group may be partially overlapped.

The obstacle recognizer 111 finally determines the obstacle based on the determination result when the obstacle is not the low obstacle or determines the low obstacle n times (S420).

According to the determination result, in response to the type of the obstacle (S430), when the obstacle is larger than a certain size or a dangerous obstacle, or cannot be bypassed (C1), the controller sets the corresponding motion to avoid the obstacle (S450).

When the moving robot can travel by bypassing the obstacle according to the determination result (C2), the controller changes the traveling path so that the moving robot travels by bypassing the obstacle and sets the corresponding motion (S460). In addition, when it is determined that the moving robot can pass the obstacle or travel by climbing the obstacle (C3), the controller sets the corresponding motion so that the moving robot enters and travels (S470). The travel controller controls the driver so that the main body travels in response thereto.

For example, when the obstacle is a box or the like, the obstacle is not the low obstacle. Accordingly, the controller sets the corresponding motion the bypassing or avoidance. Moreover, when the obstacle is the threshold, the obstacle is the low obstacle, and thus, the controller may set the corresponding motion so that the obstacle is determined at least two times and the moving robot enters and travels. Meanwhile, when the obstacle is the window frame among low obstacles, after obstacle is determined n times, the controller may set the corresponding motion so that the moving robot avoids or bypasses the obstacle.

FIG. 13 is a flowchart illustrating a method of determining the obstacle of the moving robot according to one embodiment of the present disclosure.

As illustrated in FIG. 13, the controller sets the image group for the plurality of acquired images acquired from the time when the obstacle is detected to reach the obstacle in a predetermined unit, and determines the obstacle by analyzing the image group.

The controller 110 sets the first image group by accumulating a plurality of acquired images (S560), analyzes the first image group, and recognizes the obstacle first (S570).

The controller determines whether the obstacle is the low obstacle according to a determination result according to the first obstacle recognition (S580).

If the obstacle is not a low obstacle with a certain size (height) or more, the controller finally determines the obstacle according to the first determination result without additional obstacle recognition (S640) and controls the operation by setting the corresponding motion in response thereto (S650).

When it is first determined that the obstacle is a low obstacle, second obstacle recognition is performed (S600) on the second image group of the acquired image additionally accumulated (S590).

Each image group may include acquired images to be overlapped, and the controller may determine the obstacle through the acquired image until the moving robot contacts or collides with the obstacle. However, when the obstacle is determined as a dangerous obstacle at the time of the first obstacle determination, the obstacle determination ends without contact or collision.

When the obstacle is determined as the low obstacle according to the second obstacle recognition result, the controller finally determines the obstacle according to whether the number of determinations reaches the number of settings n (S620).

In this case, when the first determination result and the second determination result are the same, the controller may terminate the obstacle determination. In addition, when the first determination result and the second determination result are different from each other, the controller may additionally perform the obstacle determination so as to perform third obstacle recognition for a third image group (S630).

Based on the learning result, the controller may designate the number of settings n, which is a criterion for the number of times to determine the obstacle, and may increase or decrease the number of settings n in some cases.

The controller sets the corresponding motion based on the determination result of the obstacle (S650), and travels in response thereto.

Accordingly, when the obstacle is detected while the moving robot travels, the moving robot may determine the position of the obstacle, analyze the plurality of acquired images in units of the image groups, identify and recognize the obstacle according to the change in the light pattern of the acquired image, and perform a designated corresponding motion according to the obstacle.

Therefore, the moving robot sets and performs the corresponding motion for whether or not to continuously travel the low obstacle difficult to recognize to pass through the low obstacle, continuously travel the low obstacle to climb the low obstacle, or avoid or bypass the low obstacle. Accordingly, it is possible to prevent the moving robot from being restrained or damaged, the moving robot can complete cleaning of all travelable areas while stably traveling the areas.

The moving robot according to the present embodiment operating as described above may be implemented in a form of an independent hardware device, and may be driven in a form included in another hardware device such as a microprocessor or a general-purpose computer system as at least one processor.

The above descriptions are merely illustrative of a technical idea of the present disclosure, and a person with ordinary knowledge in the technical field to which the present disclosure belongs will be able to make various modifications and transformations within a scope of essential characteristics of the present disclosure. Accordingly, the embodiments disclosed in the present disclosure are not intended to limit a technical idea of the present disclosure, but to describe the technical idea, and a scope of a technical idea of the present disclosure is not limited by these embodiments.

The invention claimed is:

1. A moving robot comprising:
a main body configured to travel an area;
an obstacle detector configured to capture an acquired image with respect to a light pattern irradiated in a traveling direction and detect an obstacle located in the traveling direction; and
a controller configured to recognize the obstacle according to position and shape of the light pattern from the acquired image captured by the obstacle detector and designate a corresponding motion for the obstacle according to an obstacle determination result to control an operation,
wherein the controller detects the obstacle from the acquired image input over time and determines a position of the obstacle, and the controller accumulates the acquired images, sets an image group including a plurality of acquired images in a predetermined time unit, and determines the obstacle through a change in the light patterns of the plurality of acquired images with respect to the image group,
wherein, the controller first determines the obstacle based on a first image group, determines whether or not the obstacle is an obstacle having a height lower than a certain height based on a first determination result, and additionally determines the obstacle according to a number of settings when the obstacle is the obstacle having the height lower than the certain height, and the controller determines the first determination result as a final determination when the obstacle is not the obstacle having the height lower than the certain height, and wherein, when the obstacle is the obstacle having the height lower than the certain height according to the number of settings, the controller performs a second obstacle determination on a second image group for the obstacle, performs a third obstacle determination on a third image group for the obstacle, and compares the first determination result to a third determination result with each other to finally determine the obstacle.

2. The moving robot of claim 1, wherein the controller determines the position of the obstacle by analyzing the acquired image input over time in individual image units, and determines the obstacle for the image group in a fixed time unit, and finally determines the obstacle located in the traveling direction.

3. The moving robot of claim 1, wherein the controller sets the image group according to an input order so that the acquired images do not overlap for the plurality of acquired images input from the obstacle detector.

4. The moving robot of claim 1, wherein the controller sets the image group so that at least one acquired image is included so as to overlap for the plurality of acquired images input from the obstacle detector.

5. The moving robot of claim 4, wherein the controller, among the plurality of acquired images, sets first to fourth acquired images to a first image group and sets third to sixth acquired images to a second image group.

6. The moving robot of claim 1, wherein the controller sets at least four acquired images to the image group.

7. The moving robot of claim 1, wherein the controller determines the number of acquired images included in the image group according to at least one of a time for the obstacle detector to acquire the acquired image, a traveling speed, and an obstacle detection distance of the obstacle detector.

8. The moving robot of claim 1, wherein the controller performs learning by extracting features of the obstacle from the change in the light pattern over time for the plurality of acquired images included in the image group and determines the obstacle based on learned data.

9. A control method of a moving robot, comprising:
a step of capturing a light pattern irradiated in a traveling direction using an obstacle detection and inputting an acquired image;
a step of detecting an obstacle from the acquired image to determine a position of the obstacle;
a step of accumulating and storing the acquired image and setting an image group including a plurality of acquired images every fixed time;
a step of comparing the plurality of acquired images included in the image group to extract a change in the light pattern over time and determine the obstacle; and
a step of setting a corresponding motion according to the obstacle and performing an operation according to the corresponding motion,
wherein the method further comprises:
a step of first determining the obstacle based on a first image group included in the accumulated acquired image;
a step of determining whether or not the obstacle is an obstacle having a height less than a certain height based on a first determination result;
a step of additionally performing obstacle determination according to a number of settings when the obstacle is the obstacle having the height less than the certain height; and
a step of determining the first determination result as a final determination when the obstacle is not the obstacle having the height less than the certain height, and wherein the method further comprises, when the obstacle is the obstacle having the height less than the certain height according to the number of settings:
a step of performing a second obstacle determination for a second image group;
a step of performing a third obstacle determination for a third image group; and
a step of comparing the first determination result to a third determination result with each other to finally determine the obstacle.

10. The control method of a moving robot of claim 9, wherein a step of accumulating the acquired images and classifying the obstacle from the image group to recognize the obstacle is simultaneously performed while a step of detecting the obstacle by analyzing the acquired image in an individual image unit is performed.

11. The control method of a moving robot of claim 9, wherein in the step of setting the image group, the image group is set according to an input order so that the acquired images do not overlap for the plurality of acquired images input.

12. The control method of a moving robot of claim 9, wherein in the step of setting the image group, the image group is set so that the acquired image partially overlaps for the plurality of acquired images input from the obstacle detector.

13. The control method of a moving robot of claim 9, wherein in the step of setting the image group, the number of acquired images included in the image group is determined according to at least one of a time required for acquiring the acquired image, a traveling speed, and an obstacle detection distance of the obstacle detector, and at least four acquired images are set to the image group.

* * * * *